July 10, 1956
F. W. SCHMIDT, JR
RECEIVER ANTENNA COUPLING CIRCUIT
FOR BALANCED OR UNBALANCED INPUT
Filed Oct. 9, 1950
2,754,415

INVENTOR.
FRED W. SCHMIDT JR.
BY Darby & Darby
ATTORNEYS

United States Patent Office 2,754,415
Patented July 10, 1956

2,754,415

RECEIVER ANTENNA COUPLING CIRCUIT FOR BALANCED OR UNBALANCED INPUT

Fred W. Schmidt, Jr., Cedar Grove, N. J., assignor to Allen B. Du Mont Laboratories, Inc., Clifton, N. J., a corporation of Delaware Application October 9, 1950, Serial No. 189,075

1 Claim. (Cl. 250—20)

This invention relates to receivers of electromagnetic energy and the like, such as television receivers, and to circuits therein for coupling an antenna to an input amplifier stage.

In the reception of television signals, energy received at an antenna is conducted to a receiver by means of a transmission line. In some instances this transmission line is of the coaxial or unbalanced self shielded type for the purpose of minimizing interference pickup. In other instances the line is of the parallel open wire type balanced to ground. It is desirable that a television receiver have provision for connecting to either type of transmission line.

It is an object of this invention to provide an input circuit capable of being connected to either a balanced or unbalanced line.

It is another object to provide a circuit which provides an efficient impedance match and energy transfer over a relatively wide band of frequencies.

In accordance with my invention these objects are attained by the use of a transformer of a particular physical construction connected in a particular manner between a transmission line and an input amplifier.

Figure 1:
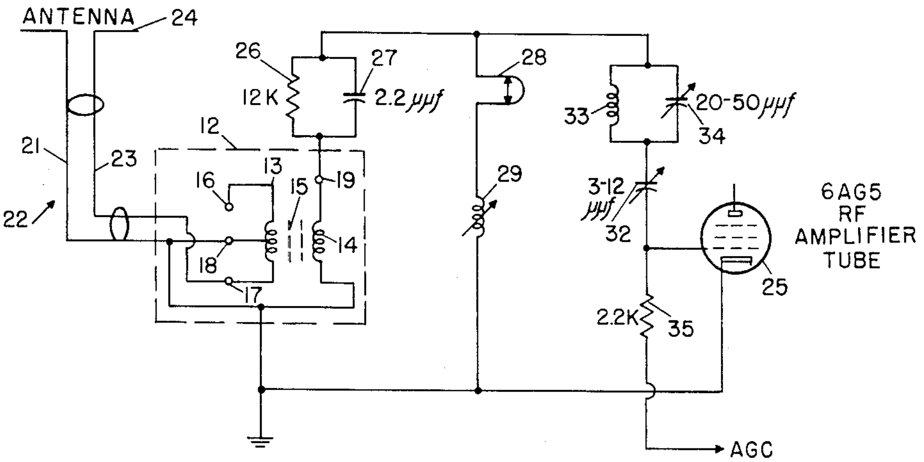
Figure 1 is a schematic diagram of an input circuit of a television receiver embodying the invention and including an unbalanced transmission line connecting the receiver to an antenna.

In Figure 1 an input transformer 12 which forms a feature of this invention comprises a primary winding 13 and a secondary winding 14 linked magnetically by means of a non-conductive magnetic core 15. The primary winding 13 is provided with a pair of end terminal connecting points 16, 17, and with a central connecting or terminal point 18 which preferably is grounded. The secondary winding 14 is connected between a terminal point 19 and the grounded central terminal point 18. An outer conductor 21 of a self shielding coaxial transmission line 22 is connected to grounded point 18 while and inner conductor 23 thereof is connected to one of the end terminals 16 or 17 of the primary winding 13. The other end of the transmission line 22 is connected to an antenna 24.

One end of the secondary winding 14 connected to the terminal point 18 is also connected to an input electrode, in this case the cathode, of a radio frequency amplifier tube 25. The other end of the secondary winding 14 is connected by terminal 19 to a second input electrode, control grid, of the tube 25, preferably through a selective network of the type described in the copending application Serial No. 189,074, filed October 9, 1950, Patent No. 2,721,260. Such a network comprises the parallel combination of a resistor 26 and a capacitor 27, this parallel combination in turn being connected in series with a trimmer inductor 28 and a tunning inductor 29 and a second series circuit comprising a trimmer capacitor 32 and a parallel connected inductor 33 and capacitor 34. This second circuit is connected between the grid of the tube 25 and the junction of the trimmer inductor 28 and the first parallel combination of inductance 26 and capacitance 27. A damping resistor 35 forms a direct connection between the grid of the amplifier tube 25 and a negative bias or source of automatic gain control.

Figure 2:
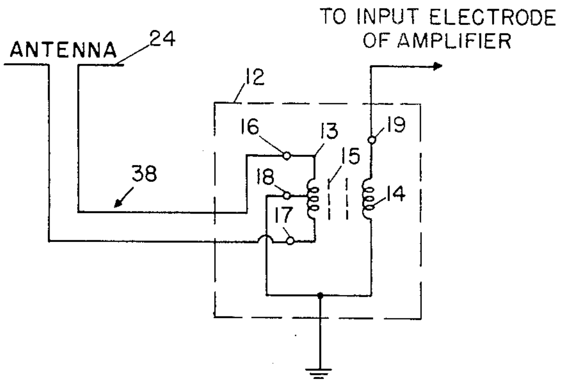
Figure 2 is a portion of the above circuit including an alternate form of connection to a balanced transmission line.

In Figure 2 a balanced transmission line 38 is connected in the preferred manner to the end terminals 16 and 17 of the transformer 12. Center terminal 18 is grounded as before.

Figure 3:
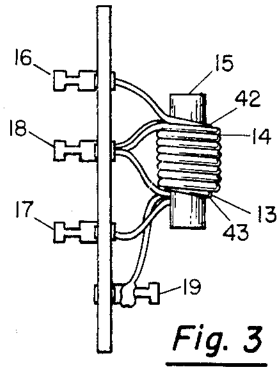
Figure 3 is a side view of a transformer which is a feature of the invention.

Referring to Figure 3, the transformer 12 as used in apparatus for present television standards, comprises a nonconductive magnetic core 15 of a high frequency grade of fine powdered iron, the core being preferably cylindrical in shape and having a diameter of $\frac{3}{16}$ inch and a length of $\frac{5}{8}$ inch. The primary winding 13 comprises two single layer interwound helices 42, 43 of four turns each of No. 24 enamel covered copper wire, the progressive direction of winding in this preferred form being that of a left handed thread. The first helix 42 is connected between the terminals 16 and 18. The second helix 43 is connected between the terminals 17 and 18, opposite ends of opposite helices being connected to the common terminal 18 which is grounded.

Figure 4:
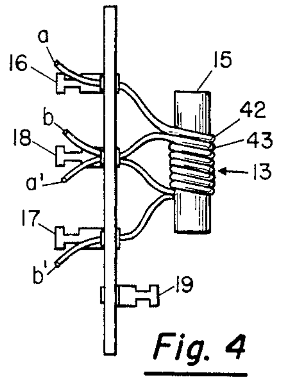
Figure 4 is a view of the same transformer assembled only in part.

The details of this primary winding 13 can best be seen in the partially assembled transformer of Figure 4, in which only the primary winding 13 has been assembled on the core 15, the ends of the windings *a*, *a'* and *b*, *b'* are shown adjacent the respective terminal lugs 16, 17 and 18, to which they are to be connected. As may be seen, one end *a'* of one helix is connected to the opposite end *b* of the other helix forming the center terminal to be grounded. The other terminal *a* of the first helix is connected to one end terminal 16, while the corresponding opposite end *b'* of the second helix is connected to the other end terminal 17.

The secondary winding 14, which in the preferred embodiment is wound outside of the primary winding, comprises seven turns of No. 24 enamel covered copper wire wound helically in a single layer and progressing in the same sense or direction as the helices of the primary winding, this direction of progression being that of a left handed thread, and connected between the terminals 18 and 19.

Although specific embodiments of my invention have been shown and described, the scope of my invention is in accordance with the following claim.

What is claimed is:

In a television receiver comprising an input circuit having a substantially constant impedance over a relatively wide band of frequencies, a transformer to couple said input circuit to and match the impedance of either of two types of transmission lines, one of said types being a balanced transmission line and the other an unbalanced transmission line, said transformer comprising a primary consisting of a balanced center tapped winding formed from a single layer winding of two wires helically wound in bifilar fashion, one end of one of said wires connected to the remote end of the other of said wires to form the center tap of said primary, and a secondary winding wound coaxially with said primary winding and formng a second layer thereover, said center tap and one end of said secondary winding being connected together, said unbalanced transmission line being connectable across said center tap and the remote end of one of said two bifilar wound wires, said balanced transmission line being conncetable across the ends remote from said center tap of the said two bifilar wound wires.

References Cited in the file of this patent

UNITED STATES PATENTS

| | | |
|---|---|---|
| 1,860,692 | Rittenhouse | May 31, 1932 |
| 1,867,037 | Tarzian | July 12, 1932 |
| 1,962,227 | Zepler | June 12, 1934 |
| 2,082,121 | Rypinski | June 1, 1937 |
| 2,132,875 | Myers | Oct. 11, 1938 |
| 2,141,573 | Vogt | Dec. 27, 1938 |
| 2,268,664 | Landon | Jan. 6, 1942 |
| 2,316,370 | Smith | Apr. 13, 1943 |
| 2,374,029 | Maslin | Apr. 17, 1945 |
| 2,374,049 | Stephens | Apr. 17, 1945 |
| 2,482,489 | Kaiser | Sept. 20, 1949 |
| 2,511,662 | Bachman | June 13, 1950 |
| 2,515,441 | Cohen | July 18, 1950 |
| 2,591,081 | Lyman | Apr. 1, 1952 |